United States Patent [19]
Wells et al.

[11] Patent Number: 5,505,409
[45] Date of Patent: Apr. 9, 1996

[54] SUPERCAVITATING AIRFRAME

[76] Inventors: Anthony R. Wells, P.O. Box 219, The Plains, Va. 22171; Stanley Blumberg, 600 Reisterstown Rd., Baltimore, Md. 21208

[21] Appl. No.: 246,447

[22] Filed: May 20, 1994

[51] Int. Cl.⁶ .................. B64C 1/38; B64C 3/54;21/10
[52] U.S. Cl. .................. 244/130; 244/3.21; 244/200; 244/204; 244/46
[58] Field of Search .................. 244/3.21, 3.24, 244/130, 131, 119, 200, 204, 218, 46

[56] References Cited

U.S. PATENT DOCUMENTS

| | | |
|---|---|---|
| 1,025,210 | 5/1912 | Sheriff . |
| 1,152,426 | 9/1915 | McCarroll . |
| 2,399,839 | 5/1946 | Vorse .................. 244/23 R |
| 2,980,370 | 4/1961 | Takacs .................. 244/130 |
| 4,225,102 | 9/1980 | Rao .................. 244/130 |
| 4,240,596 | 12/1980 | Winderman et al. .................. 244/3.16 |
| 4,650,139 | 3/1987 | Taylor et al. .................. 244/130 |
| 4,750,693 | 6/1988 | Lobert et al. .................. 244/200 |
| 4,926,130 | 5/1990 | Kranz .................. 244/3.21 |
| 5,133,519 | 7/1992 | Falco .................. 244/200 |

FOREIGN PATENT DOCUMENTS

| | | | |
|---|---|---|---|
| 393086 | 10/1908 | France .................. 244/200 |
| 531832 | 8/1955 | Italy .................. 244/130 |
| 101442 | 9/1916 | United Kingdom .................. 244/200 |
| 279776 | 9/1928 | United Kingdom . | |

*Primary Examiner*—Andres Kashnikow
*Assistant Examiner*—Virna Lissi Mojica
*Attorney, Agent, or Firm*—Lowe, Price, LeBlanc & Becker

[57] ABSTRACT

A method is described for reducing drag in airframes or airfoils. The method includes inducing cavitation in the boundary layer separating the airframe or foil skin and the air currents passing thereover to produce a reduced pressure area instead of turbulent flow. In one embodiment of this invention, a nose cone is provided for the airframe which at the juncture of its base portion provides a step between the terminal portion of the nose cone and the adjacent portion of the fuselage skin. This provides a circumferential step surrounding the fuselage which in its leeward direction induces the cavitation necessary to reduce drag. In another embodiment of this invention, steps can be provided longitudinally at mutually spaced circumferential locations extending from the front along the fuselage toward to the rear to ensure that a continuous boundary layer is provided of reduced pressure. In a third embodiment of this invention, the stepped areas are provided on the upper surface of an airfoil to extend lengthwise rather than circumferentially and provide the reduced pressure area along the upper surface to enhance lift as well as reduce drag.

1 Claim, 2 Drawing Sheets

SUPERCAVITATING AIRFRAME

FIELD OF THE INVENTION

This invention relates to a method for reducing drag in airframes by inducing cavitation in the boundary layer between the surface of the airframe or airfoil and the flight-generated airflow passing across the surface. The method for reducing drag involves an induced cavitation or reduced pressure in the boundary layer extending along the surface to reduce or eliminate turbulent flow in the boundary layer.

DESCRIPTION OF THE PRIOR ART

In the design of an airframe or airfoil, it is known that the pressure gradient in the boundary layer effects drag and therefore, efforts to maintain negative pressure as far back in the direction of flow along the body have dictated aircraft design. Typically an airframe will decrease in diameter in the direction from front to rear or at least from the mid-portion to the rear. Laminar flow in the boundary layer then produces less drag than a turbulent flow therein.

For example, in U.S. Pat. No. 4,225,102 there is described a method for controlling yaw in slender pointed bodies, such as aircraft or rocket fuselages by a pair of helical ridges extending backward along opposite sides of the fuselage from the top meridian near the nose tip to a position near the bottom meridian of the forebody of the fuselage. The trajectory being such that the ridges lie approximately normal to the boundary flow direction.

It is also known that the configuration of the nose of such a body can effect drag dramatically. For example, in U.S. Pat. No. 4,650,139, which is directed to an asymmetrical space vehicle system, a nose spike specific design affixed to the nose of the forwardmost external tank was found to be of assistance. Also, in U.S. Pat. No. 2,980,370, directed to a supersonic flying body, a nose cone having a stepped portion behind the nose together with a cylindrical neck for connecting the nose to the trunk of the body of the flying aircraft was found to be of assistance in disrupting the compressed waves produced by the nose passing through air at supersonic speeds to thereby reduce the typical sonic bomb generated.

SUMMARY OF THE INVENTION

It has been discovered however that modification of the skin of the airfoil and the nose of the airframe can produce a very substantial reduction in drag. If the surface of the object produces cavitation in the boundary layer, the negative pressure thereof will then extend along the boundary layer to thereby reduce drag.

One method according to this invention for reducing boundary layer drag includes modification of the design of the nose cone. The nose cone can be sharply pointed to induce the creation of the cavity initially, but the unique feature lies in the fact that an area is created between the afterend of the nose cone and the fuselage such that a low pressure cavity is produced at the juncture thereof. This area then extends rearwardly to reduce drag along the direction of flow along the fuselage. The cavity is induced by a stepped area at the juncture between the nose cone and the fuselage and normal to the longitudinal axis thereof. It should be understood however that the nose cone typically will be angled relative to the longitudinal axis of the fuselage in order to maximize the induced cavity.

In order to allow the airplane designed according to this invention to induce and then ride smoothly in a produced cavity at the boundary layer, it will be necessary to introduce a selective, pivoting movement of the nose cone relative to the longitudinal axis of the fuselage. This can be mechanically engineered to be controlled by the pilot similar to controls for the ailerons, horizontal stabilizers, trimming devices and the like.

In a further embodiment of this invention, the forward portion of the fuselage itself can be provided with minute transverse steps mutually spaced longitudinally therealong to further extend the cavity along the length of the forward portion of the plane. Typically such steps would be 1 to 3 millimeters in depth, but this depth would vary depending upon the fuselage size, overall length, shape, cruising speed, materials of construction and the like as would be obvious to one skilled in the art.

Furthermore, the use of such mutually spaced steps could be incorporated if desired on an airfoil such as a wing beginning at the forward portion thereof and extending along the upper surface to facilitate the formation of a cavity in the boundary layer in the direction of flow and further to assist in providing lift. In all instances, the stepped portion would be relatively minute in depth and would extend transverse to the direction of flow of the air across the surface to facilitate the extension of the cavity along the forward surface portion and to defeat the formation of turbulence in the boundary layer.

Accordingly, it is an object of this invention to provide a method for reducing drag in an airplane or other similar structure by forming a cavity in the boundary layer at least in the forward portion of the structure whereby the cavity will extend rearwardly along the direction of flow to produce an area of reduced pressure instead of turbulence.

It is another object of this invention to provide an airframe having a nose cone thereon which slopes backwardly from a pointed nose portion to a juncture with the fuselage wherein a stepped area circumferentially surrounding the fuselage is provided which in turn promotes a cavity extending rearwardly therefrom along the direction of flow of air passing over the airframe.

It is a further object of this invention to provide a method for reducing drag in an airframe wherein at least the forward portion of the frame from the nose rearwardly to the mid portion of the fuselage has minute transverse extending stepped portions for creating a cavity or area of reduced pressure in the boundary layer between the surface of the airframe and the air currents passing thereover.

It is another object of this invention to provide a method for reducing drag in airfoils wherein stepped portions are mutually spaced extending transversely across the foil to the direction of flow thereover and along the upper surface thereof to disrupt the formation of turbulence in the boundary layer as air passes thereover and to create an area of reduced pressure by cavitation.

These an other objects will become readily apparent with reference to the drawings and following description wherein:

DETAILED DESCRIPTION OF THE INVENTION

Figure 1:
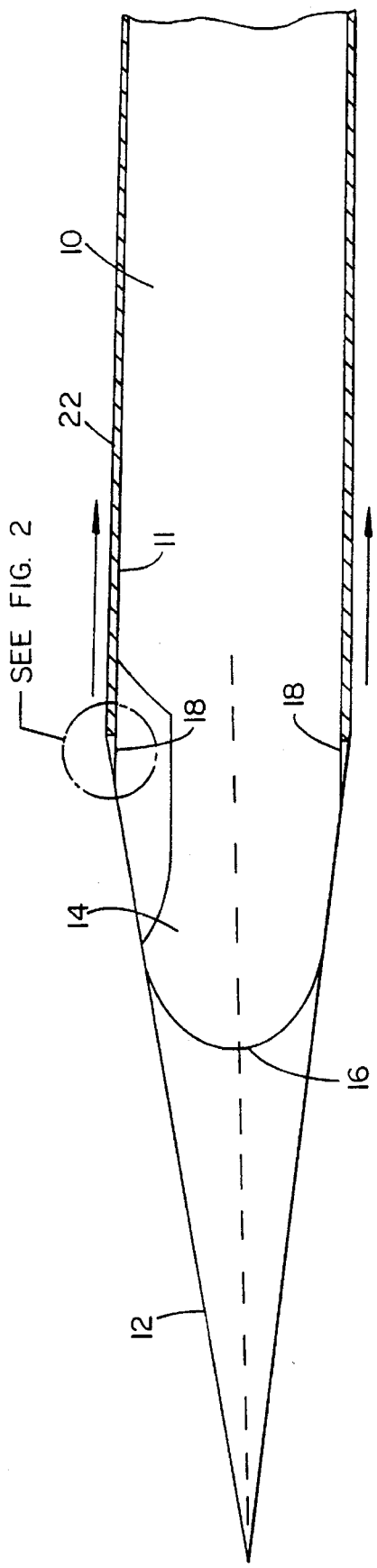
FIG. 1 is a fragmentary schematic sectional view of a fuselage having the nose of the instant invention mounted thereon.
Figure 2:
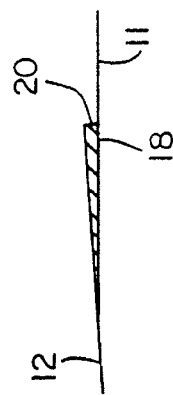
FIG. 2 is a fragmentary detailed sectional view taken at the detail circle of FIG. 1.

With reference to FIGS. 1 and 2, there is shown a fuselage 10 having mounted thereon a conical nose 12 which extends outwardly from the forward portion of the fuselage 14. Nose cone 12 is pivotally mounted on fuselage 10 and a conventional pivoting mechanism 16 is provided in the forward portion 14 of the fuselage 10. Any conventional type of pivoting mechanism would be adaptable to this invention as would be obvious to one skilled in the art. It is intended that the pivoting mechanism be controlled by the pilot similar to other conventional flight controls for aerilons, the trim mechanism and the like. The nose 12 however is intended to pivot so that its axis remains in a vertical plane containing the longitudinal axis of the plane. Pivoting then is up or down whereby the longitudinal axis of the nose 12 is disposed at a predetermined acute angle relative to the vertical plane containing the longitudinal axis of the fuselage 10.

The conical nose 12 joins the fuselage at a circumference point 18 which extends around the outer circumference of the fuselage 10. It is intended that the nose 12 terminate in a step 20 formed with the fuselage outer surface 11 as shown in FIG. 2. The step 20 can be a minute dimension relative to the overall dimensions of the fuselage 10. For example, 1–3 millimeters could be sufficient depending upon the various parameters involved such as the fuselage size, the overall length, shape, cruising speed, and material of construction as will be obvious to those skilled in the art. The step should be dimensioned sufficiently however, to create an area of reduced pressure 22 which extends rearwardly along the fuselage 10. This area 22 is in fact a disruption of the boundary layer which normally would be in turbulent flow, producing drag. The cavity which extends rearwardly from step 20 then is of reduced pressure as the air current passes over the step 20. This area 22 of reduced pressure then is described herein as cavitation or a cavity in the boundary layer which will dramatically reduce drag in the overall airframe.

As is well known, the pressure gradient in the boundary layer in the direction of flow if kept negative, will result in a decrease in drag. Depending upon the shape of the fuselage, this feature of the instant invention should extend rearwardly along the fuselage until the diameter thereof starts to decrease. This will reduce friction and maintain laminar flow in the boundary layer along the body of the airplane where the cavity is induced.

Figure 3:
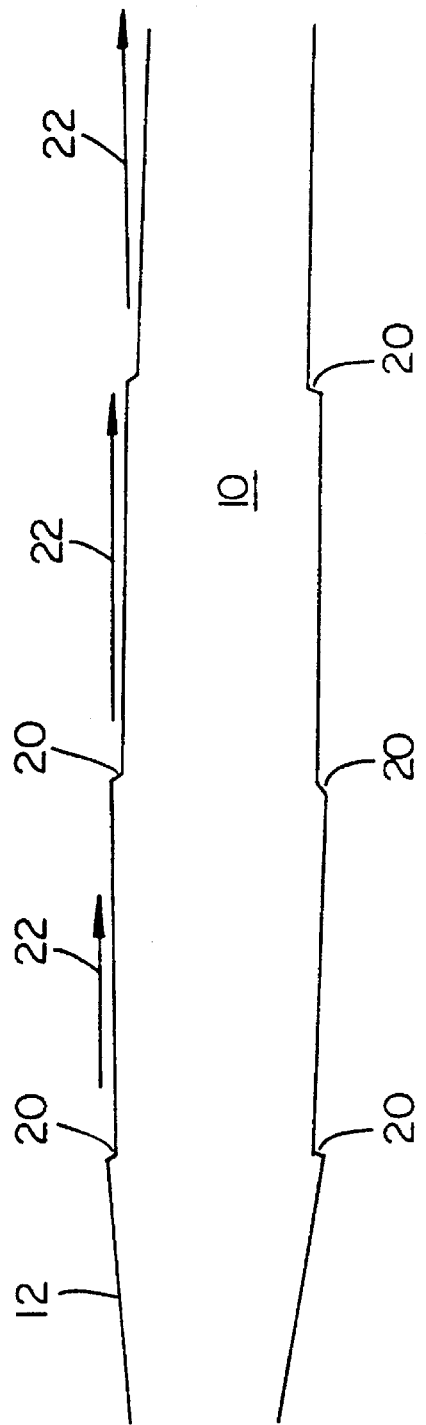
FIG. 3 is a schematic longitudinal view of an alternate embodiment of this invention adapted to a fuselage.

With attention to FIG. 3, the circumferential steps 20 of this invention may be provided in multiple increments mutually spaced longitudinally along the length of the forward portion of the fuselage to maintain the cavitational area 22 throughout the length of the fuselage 10.

Once again, the step 20 is considered to be a minute variation in the skin surface of the fuselage 10 and it need not be formed by the cone 12 but rather may be shaped by the fuselage skin. The important feature is that the step 20 be provided wherein the vertical component provides a lee behind the step, so that air currents passing over the fuselage will pass over the step creating the lee behind the step 20 which results in disruption of the boundary layer turbulence by providing the reduced pressure area 22 behind each step portion 20.

Figure 4:
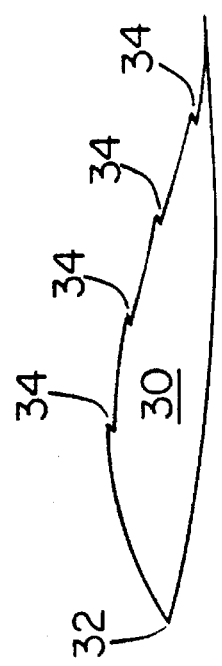
FIG. 4 is a schematic cross sectional view of an airfoil incorporating the improvement of this invention.

With reference to FIG. 4, it is also considered that the principle of this invention can be applied to an airfoil 30 whereby a leading edge 32 is provided. The upper surface then can have a plurality of steps 34 therein extending rearwardly in the direction of flow of air currents so that each step produces the lee behind the vertical portion of the step and disrupts the boundary layer. In this instance, the reduced pressure area will assist in lift as will be obvious to those skilled in the art. In an airfoil then the lift is further enhanced by providing the step portions 34.

As will be obvious to those skilled in the art, if the airfoil 30 is a wing, the steps will extend longitudinally along the length thereof and be disposed in a mutually spaced arrangement along the upper surface toward the trailing edge from the leading edge of the wing 30. In this embodiment, obviously, circumferential steps are not provided.

In summary, it has been discovered that in an airframe, or airfoil, drag can be reduced by attacking the boundary layer between the airframe skin and the air currents passing thereover. Typically an increase in boundary layer turbulence will result in increased drag. However, by inducing cavitation along the boundary layer, drag will be dramatically reduced through the production of a reduced pressure area. This reduced pressure area then is provided by a step having an outwardly sloping surface in the direction of travel of the airframe or foil with a leeward vertical step being provided so that as air currents pass over the step, the reduced pressure will produce cavitation along the surface behind the step.

In the case of a fuselage, the step can be provided at the juncture of a nose which is a sharp conical shape, and the fuselage. It is intended that the nose of course be pivoted so that maximum effect can be achieved at different air speeds. In addition, it is contemplated that the circumferential steps may be mutually spaced longitudinally along the forward portion of the fuselage so that the overall result is a boundary layer of reduced pressure created by the cavitation induced by the steps.

It is finally described that this feature may be adapted to an airfoil to assist in the lift thereof by providing longitudinal stepped portions extending along the upper surface of the wing whereby the wing shape will be enhanced at the boundary layer by the reduced pressure areas generated leewardly of the stepped portions.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. A method for reducing structural drag in air frames having a generally elongated cylindrical fuselage with an outerskin wherein as the frame passes through air currents in flight a boundary layer is formed at the skin surface which is associated with drag comprising:

forming a plurality of mutually spaced steps in said skin surrounding the circumference of and contained in a plane normal to the longitudinal axis of said fuselage said steps gradually sloping outwardly in the direction of flight and terminating in a leeward face whereby an area of reduced pressure cavitation will be formed in flight thereof in said boundary layer in the lee of said step to thereby reduce drag said steps sloping gradually outwardly from a minimum height to a maximum height relative to said skin surface downstream of said minimum height to form a streamlined surface in the direction of flight said fuselage having a forward end in the direction of flight and a nose cone pivotally mounted on said fuselage covering said forward end, said cone having an apex in the direction of flight and sloping outwardly to a maximum height above said skin surface at the base thereof to form said step.

* * * * *